(12) United States Patent
Natarajan et al.

(10) Patent No.: US 9,104,483 B2
(45) Date of Patent: Aug. 11, 2015

(54) SYSTEM AND METHOD FOR AUTOMATING AND SCHEDULING REMOTE DATA TRANSFER AND COMPUTATION FOR HIGH PERFORMANCE COMPUTING

(75) Inventors: Ramesh Natarajan, Pleasantville, NY (US); Thomas Phan, San Jose, CA (US); Satoki Mitsumori, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 11/624,253

(22) Filed: Jan. 18, 2007

(65) Prior Publication Data

US 2008/0178179 A1 Jul. 24, 2008

(51) Int. Cl.
*G06F 9/50* (2006.01)
(52) U.S. Cl.
CPC .................................... *G06F 9/5027* (2013.01)
(58) Field of Classification Search
None
See application file for complete search history.

(56) References Cited

U.S. PATENT DOCUMENTS

| | | | | |
|---|---|---|---|---|
| 5,577,204 | A * | 11/1996 | Brewer et al. ................ | 710/317 |
| 2003/0191795 | A1 * | 10/2003 | Bernardin et al. ............ | 709/105 |
| 2005/0028104 | A1 * | 2/2005 | Apparao et al. .............. | 715/738 |
| 2006/0080389 | A1 * | 4/2006 | Powers et al. ................ | 709/203 |
| 2006/0080666 | A1 * | 4/2006 | Benedetti et al. ............ | 718/104 |
| 2006/0236347 | A1 * | 10/2006 | Holovacs ....................... | 725/80 |
| 2007/0156972 | A1 * | 7/2007 | Uehara et al. ................ | 711/146 |
| 2007/0180451 | A1 * | 8/2007 | Ryan et al. .................... | 718/104 |

OTHER PUBLICATIONS

Ali Anjomshoaa et al., Job Submission Description Language (JSDL) Specification, Version 1.0, Nov. 7, 2005, Global Grid Forum, pp. 1-72.*
D. Duffie and J. Pan, "An overview of value at risk," Journal of Derivatives, vol. 4, 1997, p. 7.
E. Krevat, et al., "Job Scheduling for the Blue Gene . . . ", Job Scheduling Strategies for Parallel Processing, 8th International Workshop, Edinburgh, Scotland, UK, 2002, p. 38.
T. Phan, et al., "Evolving Toward the Perfect Schedule: Co-scheduling Job Assignment . . . ", 11th Workshop on Job Scheduling . . . , Cambridge, MA, Jun. 2005.
N.R. Adiga, et al., "An Overview of the Blue Gene Computer", IBM Research Report, RC22570, Sep. 2002.

* cited by examiner

*Primary Examiner* — Tuan Dao
(74) *Attorney, Agent, or Firm* — Daniel P. Morris; McGinn IP Law Group, PLLC

(57) ABSTRACT

The invention pertains to a system and method for a set of middleware components for supporting the execution of computational applications on high-performance computing platform. A specific embodiment of this invention was used to deploy a financial risk application on Blue Gene/L parallel supercomputer. The invention is relevant to any application where the input and output data are stored in external sources, such as SQL databases, where the automatic pre-staging and post-staging of the data between the external data sources and the computational platform is desirable. This middleware provides a number of core features to support these applications including for example, an automated data extraction and staging gateway, a standardized high-level job specification schema, a well-defined web services (SOAP) API for interoperability with other applications, and a secure HTML/JSP web-based interface suitable for non-expert and non-privileged users.

15 Claims, 4 Drawing Sheets

18 ↓

```xml
<?xml version="1.0" encoding="UTF-8"?>
<jsdl:JobDefinition sid="xxxxxxx"
xmlns:jsdl="http://schemas.ggf.org/jsdl/2005/04/jsdl">

<jsdl:JobDescription>

<jsdl:JobIdentification>
      <jsdl:JobName>HelloWorld</jsdl:JobName>
      <jsdl:Description>This program salutes the world</jsdl:Description>
    </jsdl:JobIdentification>

<!-- parameters for the executable -->
    <jsdl:Application>
      <jsdl:ApplicationName>HelloWorld</jsdl:ApplicationName>
      <jsdl:BG_MpirunApplication>
        <jsdl:BG_Mpirun_Exe>/bgl/jdoe/bin/helloworld</jsdl:BG_Mpirun_Exe>
        <jsdl:BG_Mpirun_Cwd>/bgl/jdoe/bin</jsdl:BG_Mpirun_Cwd>
      </jsdl:BG_MpirunApplication>
    </jsdl:Application>

<!-- parameters for BG/L resources used by the executable -->
    <jsdl:Resource>
      <jsdl:StdoutFileName>/tmp/stdout.txt</jsdl:StdoutFileName>
      <jsdl:StderrFileName>/tmp/stderr.txt</jsdl:StderrFileName>
      <jsdl:BG_MpirunResource>
        <jsdl:BG_Mpirun_Partition>M011_32_NE</jsdl:BG_Mpirun_Partition>
        <jsdl:BG_Mpirun_Np>32</jsdl:BG_Mpirun_Np>
        <jsdl:BG_Mpirun_Verbose>1</jsdl:BG_Mpirun_Verbose>
      </jsdl:BG_MpirunResource>
    </jsdl:Resource>

<!-- Do data stage-in. The stage-out is similar. -->
    <jsdl:PreDataStaging>
      <jsdl:SCPDataStaging>
        <jsdl:ArrangingOrder>1</jsdl:ArrangingOrder>
        <jsdl:Direction>transmit</jsdl:Direction>
        <jsdl:RemoteHostName>127.0.0.1</jsdl:RemoteHostName>
        <jsdl:RemoteUserId>doej</jsdl:RemoteUserId>
        <jsdl:RemotePassword>iluvlbm</jsdl:RemotePassword>
        <jsdl:SourceFileName>/users/doej/data/00input.blob</jsdl:SourceFileName>
        <jsdl:TargetFileName>/home/jdoe/temp/00temp.file</jsdl:TargetFileName>
      </jsdl:SCPDataStaging>
    </jsdl:PreDataStaging>

</jsdl:JobDescription>
```

```
<jsdl:SQLQueryDataStaging>
    <jsdl:ExecutionOrderGroup>11</jsdl:ExecutionOrderGroup>
    <jsdl:SQLStatement>
      <![CDATA[
        SELECT DISTINCT A.INOFC_CD, (
            (DECIMAL(SUBSTR(A.BAS_YMD,1,4)) - DECIMAL(SUBSTR(B.DEALBASDAY ,1,4))) - 0.0 +
            (DECIMAL(SUBSTR(A.BAS_YMD,5,2)) - DECIMAL(SUBSTR(B.DEALBASDAY ,5,2))) / 12.0 +
            (DECIMAL(SUBSTR(A.BAS_YMD,7,2)) - DECIMAL(SUBSTR(B.DEALBASDAY ,7,2))) / 365.0
          ), CASE '02' WHEN ? THEN A.REDEMPTION_RATE
            ELSE A.REDEMPTION_RATE + A.INTEREST_RATE END
        FROM GRID.R02X A, GRID.R103 B WHERE (A.INOFC_CD = ?) AND
          ((DECIMAL(SUBSTR(A.BAS_YMD,1,4)) - DECIMAL(SUBSTR(B.DEALBASDAY ,1,4))) - 0.0 +
           (DECIMAL(SUBSTR(A.BAS_YMD,5,2)) - DECIMAL(SUBSTR(B.DEALBASDAY ,5,2))) / 12.0 +
           (DECIMAL(SUBSTR(A.BAS_YMD,7,2)) - DECIMAL(SUBSTR(B.DEALBASDAY ,7,2))) / 365.0) >
          0.0
      ]]>
    </jsdl:SQLStatement>
    <jsdl:SQLOutputFileName>/bgl/phant/datadir/data/DATA041</jsdl:SQLOutputFileName>
    <jsdl:SQLInputFileName>/bgl/phant/datadir/data/DATA041_01</jsdl:SQLInputFileName>
    <jsdl:SQLOutputFileCreationFlag>overwrite</jsdl:SQLOutputFileCreationFlag>
    <jsdl:SQLInputFileCompression>yes</jsdl:SQLInputFileCompression>
    <jsdl:SQLOutputFileCompression>yes</jsdl:SQLOutputFileCompression>
</jsdl:SQLQueryDataStaging>
```

Figure 3

SYSTEM AND METHOD FOR AUTOMATING AND SCHEDULING REMOTE DATA TRANSFER AND COMPUTATION FOR HIGH PERFORMANCE COMPUTING

FIELD OF THE INVENTION

The present invention generally relates to data processing, and more particularly, to a system and method for a middleware for automating the synchronization and scheduling of a sequence of the steps of remote data movement and computational processing in an individual high-performance computing application.

BACKGROUND OF THE INVENTION

The present invention is concerned with a system and method for a middleware capability preferably suitable for automating the entire workflow comprising separate data transfer and computational processing steps of an individual application on high-performance computing (HPC) platforms. This middleware approach is very suitable for a large class of HPC applications that need to exchange data with a variety of external data sources using different storage formats and access protocols.

One interesting application of the middleware has been in the deployment of certain financial applications for risk modeling on HPC systems in a production setting. These are important applications in the financial industry, which in recent years has been impacted in recent years by a number of issues such as the increasing competitive pressures for profits, the emergence of new financial products, and the tighter regulatory requirements being imposed for capital risk management. A number of quantitative applications for financial risk analytics have been developed and deployed by banks, insurance companies and corporations. These applications are computationally intensive, and require careful attention to the discovery and aggregation of the relevant financial data used in the analysis.

In general, the requirements of such financial risk applications differ from other traditional scientific/engineering applications that usually run on HPC platforms, in a number of ways. For example, financial risk applications may require external data sources that include SQL databases, remote files, spreadsheets, and web services or streaming data feeds, in addition to the usual pre-staged or pre-existing flat files on the file system of the computing platform. These applications often interact with larger intra- or inter-company business workflows such as trading desk activites, portfolio tracking and optimization, and business regulatory monitoring applications. High-level services specifications for these applications must be separated from low-level service and resource provisioning, since there is a frequently a need to provide dynamic provision resources based on of quality-of-service or time-to-completion requirements. Finally, the computationally-intensive parts of these applications are usually quite easy to parallelize, since they are often independent or "embarrassingly parallel," and can be easily deployed to a variety of parallel computing platforms. On many of these parallel computing platforms, after an initial broadcast distribution of financial data to the compute nodes, each node just performs independent floating-point intensive computations with very little inter-processor communication and synchronization.

A good example is a specific proprietary application, which does a Value-at-Risk computation (D. Duffie and J. Pan, "An overview of value at risk," Journal of Derivatives, Vol. 4, 1997, p. 7), as defined below, which has may of the characteristics given above. The relevant input data for that application consisted of historic market data for the risk factors, simulation data, and asset portfolio details, and was initially extracted from an SQL database. The relevant output data consisted of empirical profit-loss distributions, was also stored in an SQL database for post-processing and for archival value.

SUMMARY OF THE INVENTION

Although the data management and computing requirements of financial risk applications appear straightforward, we have discerned that there are some inhibitors to porting and deploying these applications to HPC platforms. A major difficulty is that many HPC platforms are not well-suited for accessing data stored in high-latency external data sources outside of their local area network. In common desktop computing platforms, the network and transaction latencies for remote data access can be overlapped with other useful work by using multithreaded programming in the application. However, in many scalable, distributed-memory HPC platforms, the individual compute nodes do not support multithreaded user execution (since this will have a negative impact on the machine inter-processor communication performance), and therefore it is not possible to hide the long and unreliable latencies of remote data access. Another issue on distributed-memory HPC platforms is that applications run in a space-sharing rather than a time-slicing mode, i.e., each application uses a distinct, physically-partitioned set of nodes which is reserved for the entire duration of the application. Lastly, for performance reasons, in many HPC systems, it is desirable and in some cases mandatory to have the program data staged to and from a specialized parallel file system, such as GPFS, that is tightly coupled to the HPC platform. These data staging requirements lead to the application deployment on HPC platforms being quite ad hoc in nature, with specialized scripts to deal with data specification, data migration, and job scheduling for each individual application or problem instance.

The present invention relates to a novel system and method for a set of middleware components, that starting from a client job specification, completely automates the tasks of marshaling the data between a set of distributed storage repositories and the specialized parallel file system. In addition, the middleware also handles the synchronization and scheduling of the individual data transfer and computing tasks on the HPC platform.

Accordingly, in overview, the present invention discloses a computer system comprising:
 a high performance computing platform;
 and
 a set of middleware components comprising a capability for inputting to the high performance computing platform synchronization and scheduling of individual data transfer and computing tasks on the high performance computing platform.

The design of the middleware components preparably is motivated by requirements that are likely to be encountered across a broad range of financial computing applications. First, this layer simplifies and automates the application workflow and provides a framework for application code organization. Second, it can separate the data extraction and data migration from the computational steps on the HPC platform, so that the overall performance in a multi-application environment can be optimized by co-scheduling these different steps, in conjunction with the relevant platform-specific resource schedulers, reservation systems, and administrative policies used on the data and computing platforms. Third, it can provide support for accessing a rich variety of data sources, including databases, spreadsheets, flat files and potentially web services data, which give clients the flexibility to customize the application to the different data requirements needed for risk computations with specific trading profiles or for faster response to changing market conditions maintained in heterogeneous data sources. Fourth, the use of the fast parallel file systems for intermediate data staging, ensures the best I/O performance during the computational phase, so that valuable computer time is not tied up in high-latency, unreliable I/O operations to remote servers. Fifth, it can provide a capability to invoke the application via a web service interface, thereby allowing BG/L to participate in external business workflows as well as insulating the end-user from the specifics of the data storage and operational platforms. Sixth and finally, it ensures and enhances the mechanisms in the data management platforms for data validation, security, privacy, and audit-trail logging by extending these to the case when the data is used by an external HPC application in an on-demand mode.

More specifically, our invention supports the following features as middleware components:

1. It supports inter-operability with external business workflows via a Web services (SOAP) API, thereby allowing any standards-compliant programs with proper authentication to submit and monitor application requests.
2. It enables users to customize job requirements for specific applications by standardizing the job submission parameters in an XML job specification schema.
3. A data-staging gateway is used to prepare and stage data between external heterogeneous data servers and the HPC file system, with support for data compression and other streaming data transformations.
4. In order to facilitate the use of the application by a wider set of non-privileged users, it provides a job submission wizard using a secure HTML/JSP interface, as well as a Linux/Unix command-line toolkit for the same purpose.

The details of the present invention, both as to its structure and operation, can best be understood in reference to the accompanying drawings, in which like reference numerals refer to like parts, and in which:

BRIEF DESCRIPTION OF THE DRAWING

FIG. 2 illustrates the XML-based job specification file that is used by the middleware for instantiating the various step in the application workflow;

FIG. 3 illustrates the customization of the fragment in the XML-based job specification file that is used for data extraction from SQL databases;

DETAILED DESCRIPTION OF THE INVENTION

Figure 1:
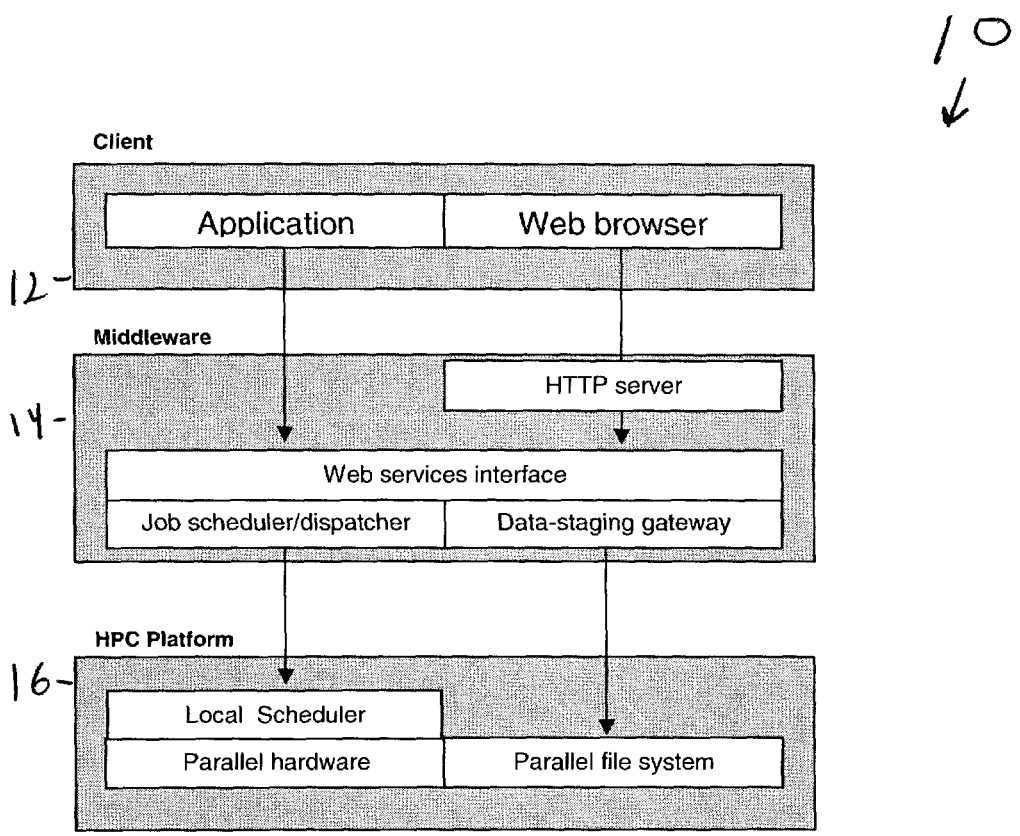
FIG. 1 illustrates schematically the logical view of the middleware components comprising the invention, layered between the client application at the top level, and the HPC hardware and file system at the bottom level.

FIG. 1 (numerals 10-16) is a schematic of the logical view of the middleware layer components. From either an application or from a web-browser interface, the client uses an XML-based job submission file, and invokes the middleware through a web services application programming interface (API). This API provides a set of remote methods for job submission and monitoring via the SOAP protocol. When the user submits a job to the middleware, it is placed in a meta-scheduler, and a 32-byte job identifier token is returned to the user, which can be used to query the job status, delete the job from the queue or to kill a running a running job. The current implementation of this meta-scheduler uses a simple FCFS scheduling algorithm for these steps, but can be extended to provide co-scheduling and synchronization the data movement and job dispatching in conjunction with the existing platform-specific scheduling and calendaring systems. The existing HPC schedulers (E. Krevat, J. G. Castanos and J. E. Moreira, "Job Scheduling for the Blue Gene/L System," Job Scheduling Strategies for Parallel Processing, 8th International Workshop, Edinburgh, Scotland, UK, 2002, p. 38) already go beyond FCFS to include job priority and node fragmentation issues; the new co-scheduling algorithms that can be developed within this middleware framework will further extend these existing schedulers to deal with the data transfer latencies and file storage issues (e.g., T. Phan, K. Ranganathan, and R. Sion, "Evolving Toward the Perfect Schedule: Co-scheduling Job Assignments and Data Replication in Wide-Area Systems Using a Genetic Algorithm," 11th Workshop on Job Scheduling Strategies for Parallel Processing, Cambridge Mass., June 2005).

The data-staging gateway enables data to be automatically staged between the external data sources and the BG/L attached file system, based on the specifications in the job submission file. It therefore replaces the current practice of performing these data transfers in a manual or ad hoc fashion. The design supports the requirement from financial services customers for running the same application repeatedly in response to changing market or portfolio data that is stored and updated in SQL databases. The data-staging gateway also provides the option for applying streaming transformations to the data while writing or reading the files on the HPC files system during the data-staging operations. For example, these files may be block-compressed on the fly to save disk storage, or even to optimize the subsequent I/O performance on the HPC platform. In the current design, the data-staging gateway is integrated with the other components of the middleware for simplicity of deployment. However, when the data server is only accessible over a wide-area network, it is preferable especially for large files, to optimize the long-haul data transfer by implementing the data extraction and compression modules as stored procedures on the data server, with the compressed files being directly transferred to the BG/L file system. Other potential server-side data transformations, such as encryption or statistical data scrambling, can also be implemented to protect data privacy on the external network and HPC file system.

The job dispatching module carries all the information for submitting computational jobs to the HPC platform or to the platform-specific job scheduler. For example, for MPI jobs submitted using the mpirun command (e.g., MPICH2 implementation of MPI, as can be found by a search for "-unix.mcs.anl.gov/mpi/mpich") will require the parameters for specifying the executable filename, the number of processors, the processor partition, and numerous other runtime options. Like most UNIX/Linux command-line programs, mpirun is usually invoked via shell scripts, but this approach is problem-specific and ad hoc in nature. The job submission file whose schema is an extension of the XML-based JSDL definition (The Job Submission Description Language Specification, Version 1.0, /projects/jsdl-wg/document/draft-ggf-jsdlspec/en/21), establishes the syntax of the job submission parameters, and helps to normalize job submission specifications and facilitates the use of cross-platform interaction between middleware and external clients using web services.

FIG. 2 (numeral 18) shows a simple example of a JSDL file for a typical job submission. Like any XML schema, the baseline JSDL establishes a proper syntax, including namespaces and elements (tags). We have extended this schema to include tags for mpirun-specific information and for the automated data stage-in and stage-out; in the future the schema can be further extended to support other high-level quality-of-service specifications that can be appropriately provisioned. Users can create this JSDL file using a text editor or an XML toolkit, and upload the file through web services to the middleware for immediate job submission. Alternatively, a JSDL file construction wizard is provided as part of the HTML/JSP based user interface, through which the various parameters of the job submission can be specified. At the end of the process, the user can either save the resulting JSDL file for future modification and/or immediately submit the job to the scheduler. Since the JSDL specification may contain user and encrypted password information that is vulnerable to hacking, a secure channel is required between the user and the middleware. For example, in the case of middleware access through the HTML pages, the HTTP server must implement SSL encryption. If the interaction is through the web services API, the security requirements as per WS-Security guidelines should be enabled. For the data-staging, in FIG. 2 shows examples of remote file transfer using scp in which the information following the SCPDataStaging tag includes the remote site, account name, password, and the filenames of the remote and copied files.

FIG. 3 (numeral 20) shows an example of the specification in the job submission file in the case of data extraction via SQL queries, which the data staging gateway supports in addition to scp data transfers for remote flat files described earlier. The information following the SQLInputFileName tag includes the database connection parameters, the SQL query statement, and the name of the file on the HPC file system to which the data is extracted (this file is taken to be in a standard CSV format). The specification is complicated by the fact that multiple SQL queries may have to be executed in a certain sequence because of inter-query data dependencies. The ExecutionOrderGroup tag indicates the group in which the specific SQL statement can be executed. All SQL statements with the same value for this parameter can be executed in independent parallel threads, but only after the SQL statements in the previous stage have been completed. The SQLInputFileName parameter gives the input file for a specific query, which contains the data from a previous stage, which are used to assign the values of the wild card parameters in the SQL query, as specified using the PreparedStatement interface of the JDBC driver. Data stage-out is performed analogously, for example, with SQL "update" instead of "select" queries.

Figure 4:
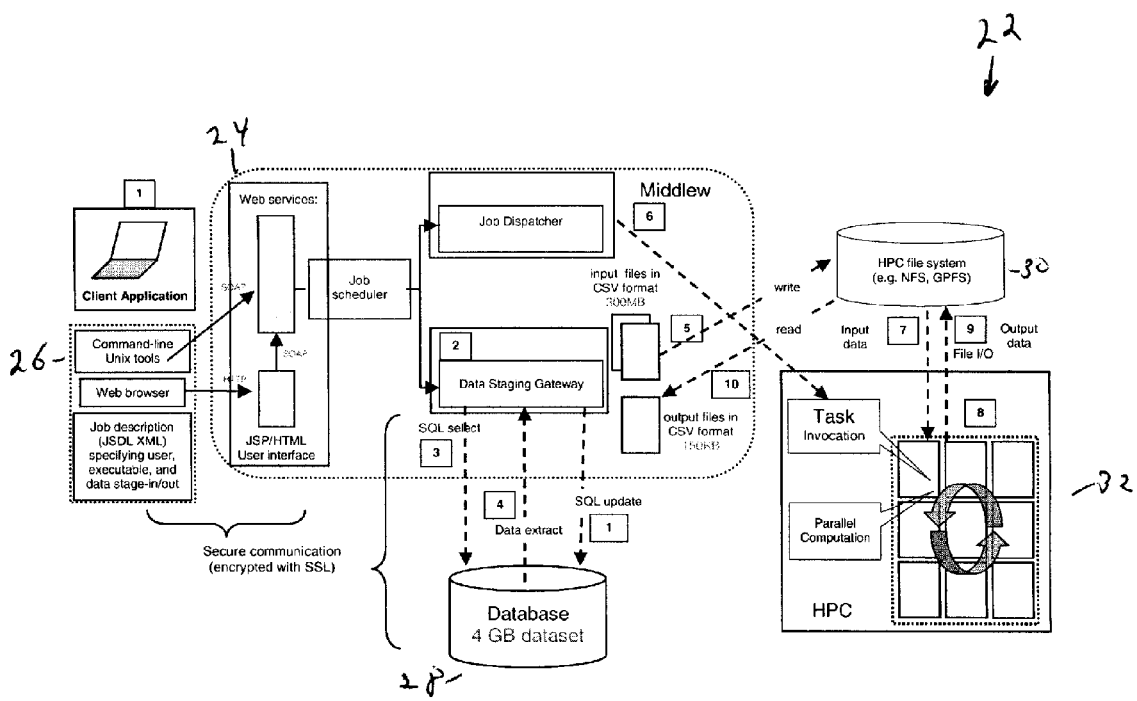
FIG. 4 illustrates schematically the role of the various components of the middleware in enabling the sequence of steps involving data transfer and computation for the execution of the application.

FIG. 4 (numerals 22-32) shows the end-to-end workflow of the financial risk application using the middleware, which illustrates the entire sequence of steps starting with the client risk application invoking the job submission procedure via web services in step 1, to the invocation of the data staging gateway in step 2 to extract and move the data from the database in steps 3-5, to the invocation of the job dispatcher in step 6, to the execution of the parallel application exchanging data with the attached file system in steps 7-9, to the invocation of the data staging gateway in step 10 for the archiving of the final results in the database in step 11.

Particular Embodiments of the Invention

The proprietary financial risk application is an example of a Monte Carlo calculation for estimating Value-at-Risk as described earlier (D. Duffie and J. Pan, "An overview of value at risk," Journal of Derivatives, Vol. 4, 1997, p. 7). This application was implemented on a parallel supercomputer Blue Gene/L (N. R. Adiga et al, "An Overview of the Blue Gene Computer," IBM Research Report, RC22570, September 2002).

This prototype Value-at-Risk code has many of the features that are required to understand the deployment and performance of the generic class of financial risk applications on HPC platforms in a production setting.

The end-to-end execution of this application proceeds in three phases, namely data pre-staging, computation, and data post-staging, as described here. The input data for this application consists of all the necessary data on portfolio holdings, the simulation data for generating scenarios, and the various algorithm parameters (e.g., the number of scenarios to be evaluated). For this application the input data was roughly 300 MB, which was distributed across 44 files. These files were extracted from a 4 GB database using standard SQL queries and procedures in a pre-staging phase. We note that this pre-computation phase would not be required if the HPC platform could efficiently access the external database via a programmatic interface; as noted earlier, the long latencies and completion uncertainties of remote communication make it very inefficient to provide direct database connectivity for a space-partitioned, distributed-memory HPC platform like BG/L. In the parallel computation phase, the required 300 MB of input data is copied to each compute node, and independent Monte Carlo simulations are performed. These independent simulations take a random set of realizations generated from the risk factor distributions to generate market scenarios, which are then used to price the instruments in the portfolio for each scenario. The output from the individual compute nodes are written to disk for post-processing and analysis. In the final post-staging phase, these results are saved to the SQL database for archiving and further analysis.

This prototype application is typical of the intra-day market risk calculations that are routinely performed in many large banks. The input data for this application changes between successive calculations only for those variables that are based on market conditions, such as equity prices, exchange rates, yield curves and forward curves. We estimate that in production settings, a typical large bank might hold about 250,000 instruments in its portfolio, of which 20% may need to be priced by Monte Carlo, while the remaining 80% may be priced by closed-form approximations. In addition, roughly 100,000 scenarios are required in the Monte Carlo simulations to obtain empirical profit-loss distributions for estimating the relevant Value-at-Risk quantiles with the required statistical confidence.

We claim:
1. A computer system, comprising:
    a high performance computing (HPC) platform comprising a plurality of processors for executing parallel processings; and
    a set of middleware components, as executed by at least one processor in said computer system, providing a capability for inputting to the high performance computing platform a synchronization and a scheduling of indi- vidual data transfer and computing tasks on the high performance computing platform,
wherein the set of middleware components comprises:
a job scheduler that receives a job submission description file, wherein the job submission description file comprises an XML (Extensible Markup Language)-based job submission description file, that encodes various steps in an application workflow, based on extending a JSDL (job submission description language) schema; and
a data-staging gateway which automates a data extraction and migration for an HPC application from remote data sources, wherein the remote data sources selectively include any of Structured Query Language (SQL) databases, spreadsheets, and flat files, using specifications in the job submission description file, so as to control an execution of data format conversions and access protocols to automatically extract data from a remote data source and to store the extracted data in a file system associated with the HPC platform, in a format defined by the job submission description file, said remote data sources comprising data sources at locations accessible via a network with access latency times longer than an access latency of data within a local area network of said HPC platform.

2. A computer system according to claim 1, further comprising an application programming interface for submitting the job submission description file to the set of middleware components via a web services interface.

3. A computer system according to claim 1, wherein the set of middleware components provides a capability for separating data extraction and migration steps from computational steps on the high performance computing platform, so that an overall execution in a multi-application environment can be optimized by co-scheduling these different steps, in conjunction with relevant platform-specific resource schedulers.

4. A computer system according to claim 1, wherein the set of middleware components further comprises a job-dispatcher which invokes a computation job on the high performance computing platform, in coordination with the data-staging gateway, using the specifications in the job submission description file.

5. A method to improve efficiency in accessing remote data sources in a high performance computing (HPC) platform, said method comprising:
executing, on a processor associated with said HPC platform, a set of middleware components, wherein said set of middleware components further comprise a job dispatcher, said method further comprising said job dispatcher dispatching a task invocation to said HPC platform for an execution of a parallel application processing of said received data, said middleware components including a data-staging gateway component which automates a data extraction and migration for an HPC application from remote data sources, using specifications in a job submission description file, said remote data sources comprising data sources at locations accessible via a network with access latency times longer than an access latency of data within a local area network of said HPC platform;
invoking a job submission procedure to a remote data source, by said data-staging gateway, using web services;
receiving, in said data staging gateway, data extracted from said remote data source;
returning final results of said parallel application processing to said data-staging gateway; and
said data-staging gateway transmitting said final results to said remote data source for archiving.

6. The method of claim 5, wherein said parallel application processing comprises a financial application.

7. The method of claim 6, wherein said parallel application processing comprises a financial risk analysis.

8. The method of claim 5, wherein said data-staging gateway supports at least one of a data compression or other streaming data transformations.

9. The method of claim 5, wherein a job to the set of middleware components is submitted and monitored by a client using a job submission file through a web services application programming interface (API).

10. The method of claim 5, wherein said data-staging gateway writes said received data to an HPC file system for access of said received data to said HPC platform for said parallel application processing and said data-staging gateway reads said final results from said HPC file system for said archiving of final results to said remote data source.

11. A set of middleware components, as executed by at least one processor in a computer system having a high performance computing (HPC) platform,
wherein said set of middleware components provides a capability for inputting to the high performance computing platform a synchronization and a scheduling of individual data transfer and computing tasks on the high performance computing platform, said set of middleware components further comprising:
a job scheduler that receives said job submission description file, wherein the job submission description file comprises an XML (Extensible Markup Language)-based job submission description file, that encodes various steps in an application workflow, based on extending a JSDL (job submission description language) schema;
an application programming interface for submitting the job submission description file to the set of middleware components via a web services interface,
said set of middleware component comprising a data-staging gateway component which automates a data extraction and migration for an HPC application from remote data sources, wherein the remote data sources selectively include any of Structured Query Language (SQL) databases, spreadsheets, and flat files, using specifications in a job submission description file, and
said remote data sources comprising data sources at locations accessible via a network with access latency times longer than an access latency of data within a local area network of said HPC platform.

12. The set of middleware components of claim 11, wherein the set of middleware components further comprises a job-dispatcher which invokes a computation job on the high performance computing platform, in coordination with the data-staging gateway, using the specifications in the job submission description file.

13. The set of middleware components of claim 11, wherein said data-staging gateway component automatically:
invokes a job submission procedure to a remote data source using web services; and
receives data extracted from said remote data source.

14. The set of middleware components of claim 11, wherein said extending said JSDL schema comprises an extension to incorporate automated data stage-in and stage-out features and to incorporate tags related to an HPC platform communication protocol.

15. The set of middleware components of claim 14, wherein said protocol tags comprise information specific to a mpirun command.

\* \* \* \* \*